(12) United States Patent
Breton (10) Patent No.: US 12,298,200 B2
(45) Date of Patent: May 13, 2025

(54) AUTOMOBILE WHEEL HUB ADAPER SYSTEM FOR USE IN TESTING A VEHICLE

(71) Applicant: HORIBA INSTRUMENTS INCORPORATED, Irvine, CA (US)

(72) Inventor: Leo Alphonse Gerard Breton, Washington, DC (US)

(73) Assignee: HORIBA INSTRUMENTS INCORPORATED, Irvine, CA (US)

( * ) Notice: Subject to any disclaimer, the term of this patent is extended or adjusted under 35 U.S.C. 154(b) by 0 days.

(21) Appl. No.: 17/844,365

(22) Filed: Jun. 20, 2022

(65) Prior Publication Data

US 2023/0003618 A1    Jan. 5, 2023

Related U.S. Application Data

(60) Provisional application No. 63/217,610, filed on Jul. 1, 2021.

(51) Int. Cl.
*G01M 17/013* (2006.01)
*G07C 5/08* (2006.01)

(52) U.S. Cl.
CPC ......... *G01M 17/013* (2013.01); *G07C 5/0808* (2013.01); *G07C 5/0816* (2013.01)

(58) Field of Classification Search
CPC .. G01M 17/013; G01M 17/00; G01M 17/007; G01M 17/0072; G01M 17/0078
See application file for complete search history.

(56) References Cited

U.S. PATENT DOCUMENTS

| 3,277,702 | A |   | 10/1966 | Brenneke |   |
|---|---|---|---|---|---|
| 4,430,802 | A | * | 2/1984 | Cole | G01B 7/315 |
|   |   |   |   |   | 33/DIG. 13 |
| 4,938,055 | A | * | 7/1990 | Tsuda | G01N 3/56 |
|   |   |   |   |   | 73/146 |
| 4,941,347 | A | * | 7/1990 | Iijima | G01M 15/02 |
|   |   |   |   |   | 73/116.02 |
| 5,465,615 | A |   | 11/1995 | Petersen et al. |   |
| 6,217,456 | B1 | * | 4/2001 | Jacob | F16D 3/065 |
|   |   |   |   |   | 464/146 |
| 6,367,680 | B1 | * | 4/2002 | Duggan | F16D 3/33 |
|   |   |   |   |   | 29/DIG. 48 |

(Continued)

FOREIGN PATENT DOCUMENTS

EP    2541225 A1    1/2013
JP    03-048514 Y2    10/1991

(Continued)

OTHER PUBLICATIONS

International Search Report and Written Opinion for International Application No. PCT/US2022/034152, dated Oct. 17, 2022.

(Continued)

*Primary Examiner* — Eric S. McCall
(74) *Attorney, Agent, or Firm* — Brooks Kushman P.C.

(57) ABSTRACT

A vehicle test system includes a free-wheeling automobile wheel including a rim defining a rim passage, and a bearing that extends through the rim passage such that the bearing is outside the rim to support the free-wheeling automobile wheel and retracts through the rim passage such that the bearing is inside the rim.

19 Claims, 10 Drawing Sheets

(56) References Cited

U.S. PATENT DOCUMENTS

| | | | | |
|---|---|---|---|---|
| 8,505,374 B1* | 8/2013 | Arseneau | | G01L 3/24 73/116.05 |
| 9,109,973 B2 | 8/2015 | Inhoff et al. | | |
| 9,958,015 B2* | 5/2018 | Mondragon | | F16D 3/065 |
| 11,656,153 B1* | 5/2023 | Boecker | | G01M 13/025 73/118.01 |
| 2002/0132676 A1 | 9/2002 | Glowacki | | F16C 3/035 464/175 |
| 2003/0183023 A1* | 10/2003 | Kusters | | G01M 17/0072 73/865.9 |
| 2006/0143931 A1* | 7/2006 | Jackson | | G01B 11/2755 33/203.12 |
| 2009/0211376 A1* | 8/2009 | Landrieve | | G01D 5/2449 73/862.333 |
| 2009/0216484 A1* | 8/2009 | Schommer | | G01B 11/2755 33/228 |
| 2010/0122574 A1* | 5/2010 | Goto | | G01M 15/044 73/146 |
| 2011/0303000 A1* | 12/2011 | Engstrom | | G01M 17/0074 73/116.06 |
| 2011/0303018 A1* | 12/2011 | de Bondt | | G01N 19/02 73/862.381 |
| 2014/0310967 A1* | 10/2014 | Nagornov | | G01B 5/255 33/301 |
| 2018/0095007 A1* | 4/2018 | Mizuta | | G01M 15/102 |
| 2019/0383680 A1* | 12/2019 | Kiuchi | | G01L 3/242 |
| 2020/0011766 A1* | 1/2020 | Nakano | | G01N 3/56 |
| 2020/0225120 A1* | 7/2020 | Engström | | G01M 17/06 |
| 2020/0284695 A1* | 9/2020 | Ikeda | | G01M 13/025 |
| 2021/0010902 A1* | 1/2021 | Breton | | G07C 5/02 |
| 2021/0188239 A1* | 6/2021 | Gugler | | B60W 10/04 |
| 2021/0348655 A1* | 11/2021 | Davazli | | F16C 29/04 |
| 2022/0221376 A1* | 7/2022 | Breton | | G01M 15/02 |
| 2022/0244142 A1* | 8/2022 | Breton | | H04N 23/90 |
| 2023/0135131 A1* | 5/2023 | Benini | | G01L 5/28 73/132 |
| 2024/0230467 A1* | 7/2024 | Hell | | G01M 13/025 |

FOREIGN PATENT DOCUMENTS

| | | |
|---|---|---|
| JP | 2797378 B2 | 9/1998 |
| JP | 2017110956 A | 6/2017 |
| WO | 2011151342 A1 | 12/2011 |

OTHER PUBLICATIONS

Ballo F et al: "Impact tests of wheels of road vehicles: A comprehensive method for numerical simulation", International Journal of Impact Engineering, Pergamon, GV, vol. 146, Sep. 10, 2020 (Sep. 10, 2020), XP086290969, ISSN: 0734-743X, DOI: 10.1016/J.IJIMPENG.2020.103719 [retrieved on Sep. 10, 2020] *abstract* * 2. Impact test description* * figures 1-4*.

Supplementary Partial European Search Report for Epsn EP22833916, dated Mar. 31, 2025, 14 pages.

* cited by examiner

AUTOMOBILE WHEEL HUB ADAPER SYSTEM FOR USE IN TESTING A VEHICLE

CROSS-REFERENCE TO RELATED APPLICATION

This application claims the benefit of U.S. App. No. 63/217,610, filed Jul. 1, 2021, the entire contents of which are incorporated by reference herein.

TECHNICAL FIELD

The present disclosure relates to the laboratory testing of any vehicle for which it is desirable for the vehicle to either steer itself, in the case of autonomous vehicles, or be steered during the testing, in the case of non-autonomous vehicles or autonomous vehicles with their autonomous features disabled. Vehicle types include autonomous vehicles, Connected and Autonomous Vehicles (CAVs), and semi-autonomous vehicles with some autonomous control features or functions. Depending the on the vehicle powertrain type, it may relate to automotive exhaust gas emissions measurement and analysis (internal combustion engine vehicles), the measurement of the fuel economy or energy efficiency of automobiles, and the control or evaluation of autonomous control systems for automobiles. More specifically, it relates to testing autonomous or semi-autonomous vehicles without disengaging automated or emergency steering functions, the effectiveness or performance of autonomous vehicle systems and functions, the impacts of autonomous features or steering a non-autonomous vehicle, on the fuel economy, energy efficiency, or emissions performance of the vehicle.

BACKGROUND

Chassis roll dynamometers for applying loads to complete vehicles during laboratory testing have been available for decades and powertrain dynamometers for applying loads to individual drive wheels, axles, or hubs are also available. Such dynamometers have not traditionally allowed the vehicle to be steered, or self-steered, in the case of a non-autonomous or autonomous vehicle, respectively.

With the growing popularity of vehicles with autonomous features that involve either automated steering of the vehicle itself, or automated control of the powertrain based, at least in part, on the steering angle input by the driver of the vehicle, it is becoming increasingly important to allow a vehicle to be steered either manually or automatically during laboratory-based dynamometer testing.

Numerous designs for allowing vehicle steering during chassis dynamometer testing are being investigated by various dynamometer suppliers. The designs tend to be very complex and expensive, however, and cannot be retrofitted to existing dynamometers. There exists a need for a low-cost apparatus and method for enabling vehicle steering on existing chassis and powertrain dynamometer designs, as well as for retrofitting to existing dynamometers.

SUMMARY

Here, certain embodiments may relate to conducting laboratory testing of vehicles in which vehicle steering angle is an input to a vehicle control system, for example a vehicle with longitudinal speed control that uses steering angle to determine whether or not another vehicle or object is in the path of the vehicle. Other embodiments may relate to testing of vehicles in which steering angle is an output to a vehicle control system, for example an autonomous vehicle with automatic lane changing capabilities, Lane Keep Assist (LKA) functionality, or automated steering for emergency obstacle avoidance. The exemplary embodiments herein show apparatuses and methods that allow the emissions and energy efficiency impacts, and the performance of automatic or emergency steering actions of autonomous control vehicle functions to be accurately determined. When used in conjunction with simulating or replicating real-world traffic events in a controlled environment, emissions, energy efficiency, system, and safety system performance can be calibrated, evaluated, and improved.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain embodiments allow a vehicle to be steered by a driver, or in the case of an automated vehicle, self-steered by an autonomous control system of the vehicle while a dynamometer applies a load to the vehicle during a laboratory test of the vehicle. The test may be for purposes of verifying performance or functionality of autonomous control systems or algorithms, for measuring the exhaust emissions or energy efficiency of the vehicle under autonomous driving control, or for any other purpose for which it is necessary or advantageous for the steering angle of the vehicle to be changed, or allowed to change, during the test.

A first embodiment is the apparatus shown in FIGS. 1A through 1E for use with a powertrain dynamometer 11. Prior to testing with one or more powertrain dynamometers 11 for placing a desired load on each driven axle shaft, each of the driven wheels (not shown) of a vehicle 1 is removed and replaced with a special automobile free-wheeling bearing wheel 6. The bearing wheel 6 comprises a rim 60, hub bearings 53, retractable floor bearings 9, rim passages 55 for the floor bearings 9 to pass through, tire passages 12 for the floor bearings 9 to pass through, floor bearing retraction rods 57, and a non-pneumatic tire 59. The hub bearings 53 mate with the vehicle 1 driven hub (obscured by the brake disc 19 in the figures) on the inside of the bearing wheel 6, allowing the driven hub to rotate with the free-wheeling hub bearings 53, independently of the wheel or non-pneumatic tire 59. The brake caliper 21 is also shown for reference.

The floor bearings 9 of each bearing wheel 6 are retracted through the rim 60 prior to the vehicle 1 being moved or rolled into position for testing. The retraction of the floor bearings 9 is accomplished by adjusting the floor bearing retraction rods 57, accessible near the bearing wheel 6 hub, to move the floor bearings 9 beneath the outer surface of the non-pneumatic tire 59, through the tire passages 12 and wheel passages 55. With the floor bearings 9 retracted neatly into the bearing wheel 6, i.e. inside the rim 60 and recessed below the outer surface of the non-pneumatic tire 59, the vehicle can be pushed or rolled into the desired position for testing whereby the rims 60 rotate independently from the vehicle wheel hubs and other vehicle powertrain components.

After the vehicle 1 is placed into position for testing, each of the rims 60 is rotated until the floor bearings 9 are in close proximity to, and approximately centered with respect to the laboratory floor 2. By adjusting the retraction rods 57 associated with each bearing 9, the floor bearings 9 are then extended radially outward through the rim passages 55, to be outside the rim 60 and protruding out from the surface of the non-pneumatic tire 59 through tire passages 12 aligned or in registration with the rim passages 55, until normal vehicle height with respect to the laboratory floor 2 is achieved, thereby raising the non-pneumatic tire 59 off of the laboratory floor 2 so the bearing wheels 6 only contact the laboratory floor 2 via the floor bearings 9. In this way, each rim 60 is free to steer with respect to the laboratory floor 2 or test cell bedplate, with little friction against the floor 2 or bedplate surface. The combination of the two floor bearings 9 also provides a stable platform for each rim 60 that prevents the rim 60 from rotating with the wheel hub during testing.

Referring to FIGS. 1A through 1E, a telescoping driveshaft 13 comprises variable angle joints, e.g. Constant Velocity joints or universal joints, on opposite ends thereof, a sliding connection to a drive shaft, e.g. using splines, configured to be mounted out-board of an automobile wheel or a free-wheeling automobile wheel. The telescoping driveshaft 13 may also comprise a variable length linkage, e.g. a spring, or actuator having a fixable end, and a movable portion including a mount configured to be attached to the telescoping drive shaft and permit the telescoping drive shaft to rotate therein, wherein the variable length linkage is configured to apply a translational force to the telescoping drive shaft to establish a predetermined angle, in the absence of other steering forces, between a longitudinal axis of the telescoping drive shaft and a central axis of one of the variable angle joints.

The embodiment shown in FIGS. 1A through 1E is a telescoping driveshaft 13 comprising an internally-splined drive shaft 27, an inner Constant Velocity Joint (CVJ) 23 with inner CVJ external splines 29, an inner hub flange adapter 31, an outer CVJ 25 with outer CVJ external splines 30, and an outer shaft adapter 33. The inner CVJ external splines 29 mate with the internal splines (not shown) on inner end of the internally-splined dynamometer drive shaft 27, thereby providing a sliding fit. The outer CVJ external splines 30 mate with the internal splines (not shown) on the outer end of the internally-splined dynamometer drive shaft 27, thereby providing an additional sliding fit. The sliding fits of the two sets of splines effectively create a variable length or telescoping driveshaft 13 that automatically compensates for dynamic changes in distance between the connection point at the vehicle hub end and the dynamometer as steering angle changes.

The outside of the bearing wheel 6 is mated to the inner CVJ 23 or universal joint via the inner hub flange adapter 31. The outer CVJ 25 mates with a dynamometer shaft flange 35 via a shaft adapter 33, thereby driving the dynamometer shaft 37, or being driven by the dynamometer shaft 37, depending upon the operating modes of the vehicle 1 and the dynamometer 11.

By installing bearing wheels 6 on the vehicle 1, connecting the bearing wheel assemblies to the dynamometers 11 as described above, and securing the vehicle 1 according to normal practices, the vehicle 1 is prepared for dynamometer testing whereby the dynamometers 11 place a load on the vehicle powertrain through the bearing wheels 6 without causing rolling rotation of the bearing wheels 6 themselves. The vehicle can be easily steered with little friction against the surface of the floor 2 due to the action of the floor bearings 9. Additionally, the combination of inner CVJ 23, outer CVJ 25, splined shafts 29 that slide within the drive shaft 27 allow for a sliding connection to the dynamometer to adjust for changes in the needed shaft length corresponding to the hub 19 steering angle. The top views of FIGS. 1D and 1E show the geometry of the dynamometer shaft 27 for straight steering vs. a right turn in which there is a rotation of the vehicle 1 hub about a ball joint 15 due to the action of the steering system tie rod 14.

A vehicle traveling on a road experiences a steering centering force that causes the steering angle to return to zero when no external force is applied by the driver or by an automated steering system. To simulate this centering force during laboratory testing, an external actuator 39 is connected to a laboratory bed plate or floor 2 at one end, and a fixed driveshaft bearing mount 47 by an actuator rod 43 and rod joint 45, at the other end as shown. The external actuator 39 then applies a centering force to the dynamometer driveshaft 27, biasing the driveshaft 27 to remain centered, or in a straight line with respect to the inner CVJ 23 and vehicle wheel hub. The force exerted by the external actuator 39 can be constant, or can be made dependent upon steering angle, depending on testing needs.

Figure 2A:
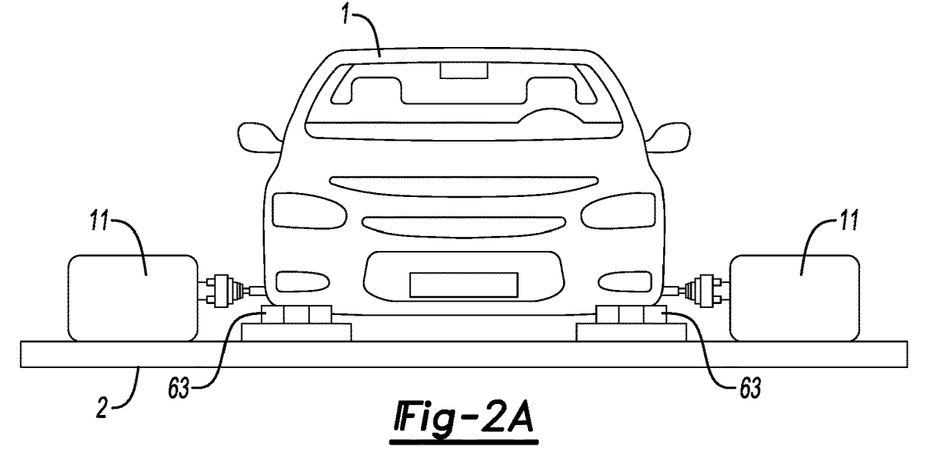
FIGS. 2A, 2B, and 2C show, respectively, front, side, and top views of a variation of the apparatus shown in FIGS. 1A through 1E comprising an alternative means for enabling dynamic vehicle steering in conjunction with a conventional vehicle powertrain or axle shaft dynamometer.
Figure 2B:
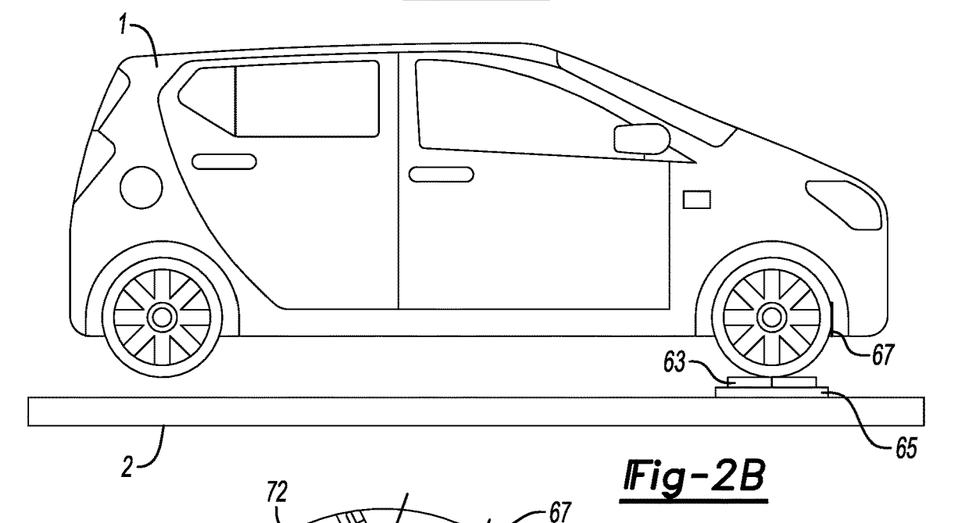
Figure 2C:
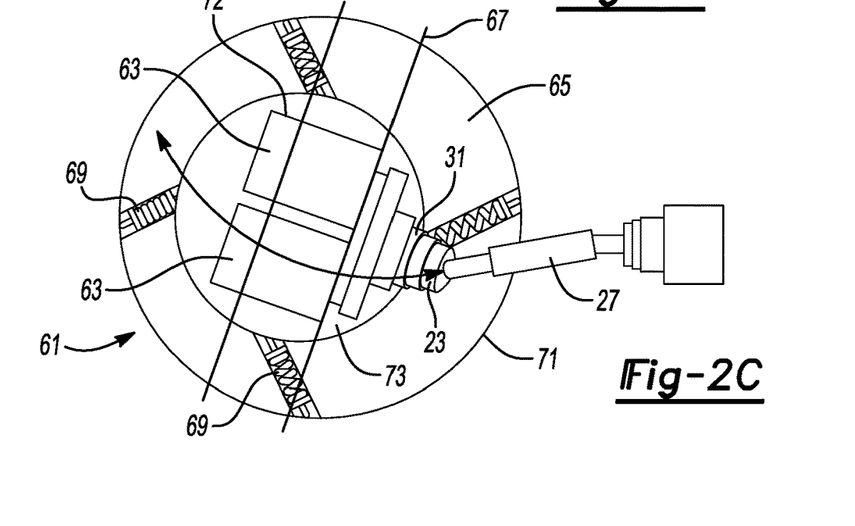
Figure 3A:
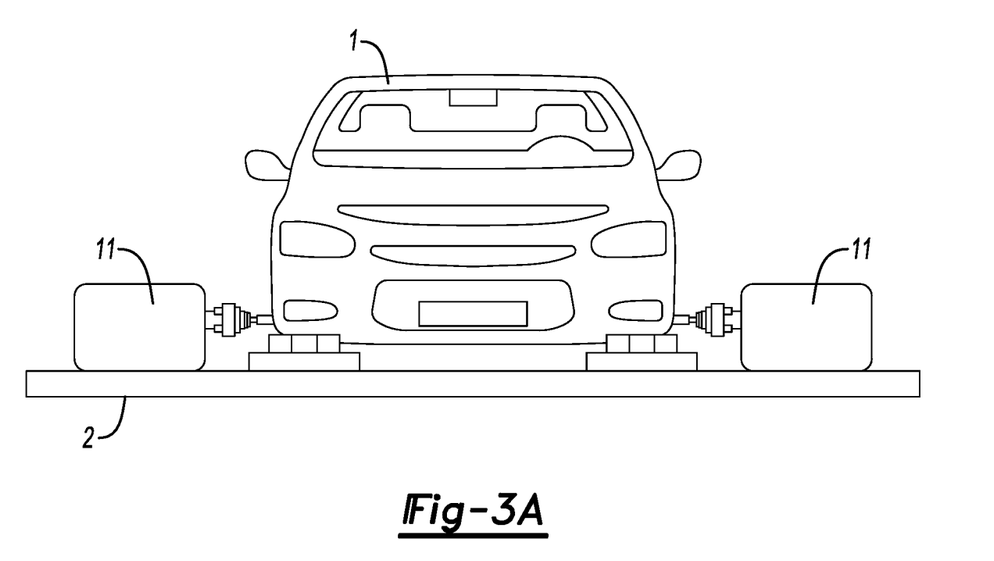
FIGS. 3A, 3B, 3C, and 3D show, respectively, front, side, top, and side views of another variation of the apparatus shown in FIGS. 1A through 1E comprising another alternative means for enabling dynamic vehicle steering in conjunction with a conventional vehicle powertrain or axle shaft dynamometer.
Figure 3B:
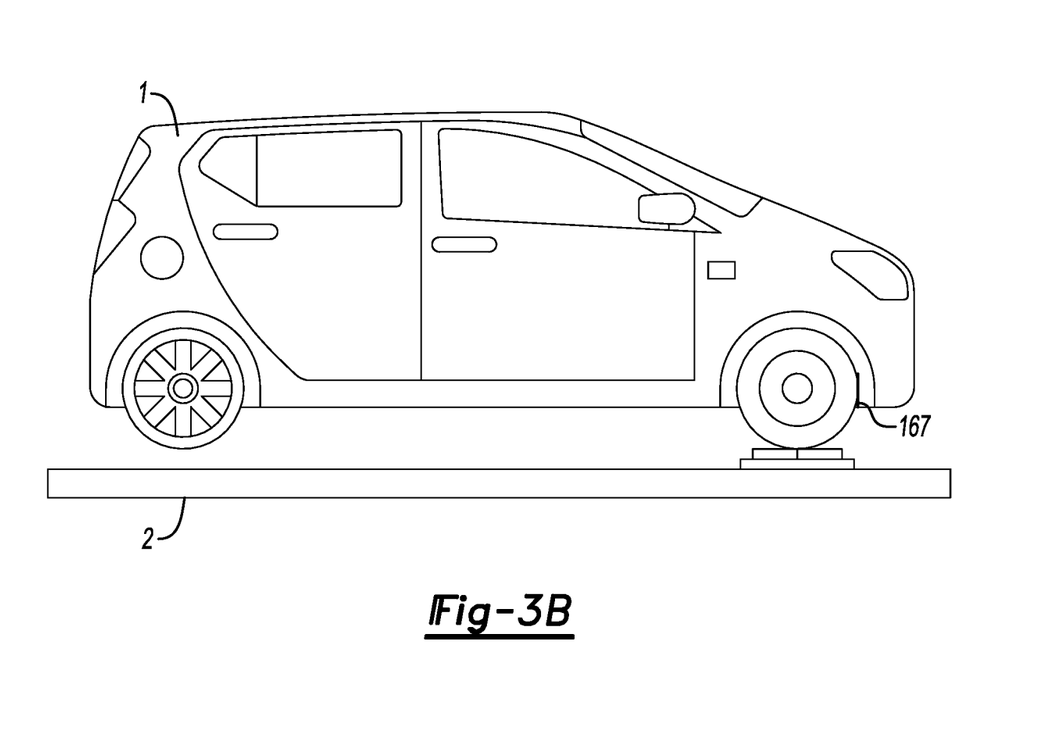
Figure 3C:
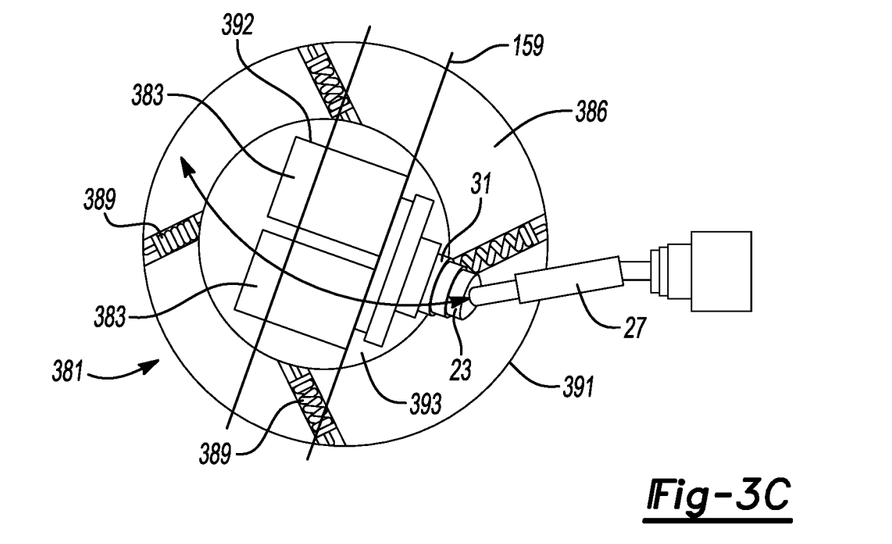
Figure 3D:
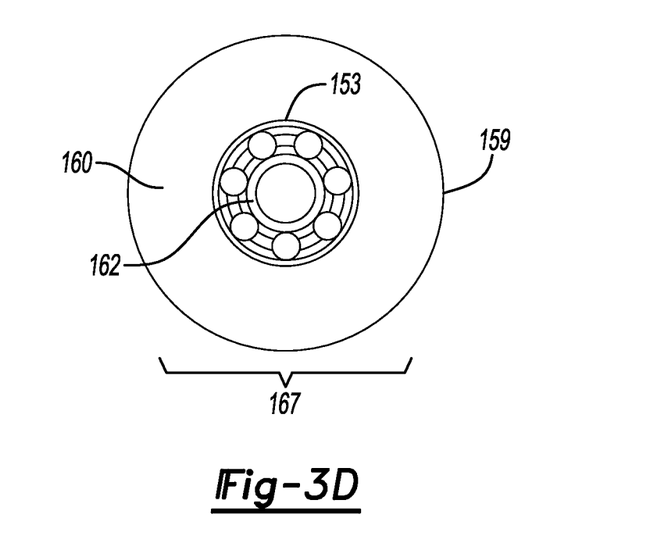

A second embodiment is the apparatus shown in FIGS. 2A through 2C. It does not require vehicle drive wheels 67 to be removed or replaced with specialized wheels. To allow the drive wheels 67 to spin and the steering angle to change, a turntable assembly 61 employing a pair of rotatable rolls 63 is placed under each vehicle drive wheel 67. An inner CVJ 23 is attached to the vehicle wheel hub using extended lugs passing through the hub adapter 31. Otherwise, the apparatus is the same as the first apparatus described above. Wheel spinning is accommodated by the rolls 63, which are free to spin, and dynamic steering angle is accommodated by a rotatable table 73 of the turntable assembly 61. Spring attachments 69 non-rigidly secure the rotatable table 73 to a turntable frame 71, allowing a turntable roll assembly 73 comprising the rotatable rolls 63 to move in a plane in response to movements of the mating drive wheel 67 as steering angle changes, i.e. for accommodating for changes in the steering angle, while also compensating for any offsets in drive wheel 67 position caused by an axis of steering rotation offset from the center of the drive wheel 67 itself. Compression or extension of the spring attachments 69 or similar mechanism creates a steering centering force to return the roll assembly 73 to be in line with the longitudinal axis of the vehicle 1 whenever no steering forces are applied by a driver or autonomous vehicle system.

A third embodiment is the apparatus shown in FIGS. 3A through 3D. It requires the vehicle drive wheels to be removed and replaced with specialized free-wheel hub wheel assemblies 167 comprising a wheel 60, a tire 159, and a hub bearing 153 with an inner bearing race 162. The hub bearing 153 isolates spinning of the inner bearing race 162 from the wheel 160 and tire 159, i.e. when attached to the vehicle driven hub via the hub adapter 31, it allows the vehicle driven hub to spin with a connected powertrain dynamometer 11 without causing any spinning of the wheel 160 itself. A turntable assembly 381 comprising a wheel chock assembly 392, itself comprising a pair of fixed, non-rotating wheel chocks 383 placed under each tire 159 so the wheel chocks 383 cradle the tire and support the weight of the vehicle 1. Steering angle changes under manual or automated driving conditions are accommodated by a rotatable table 393 supporting the chock assembly 392. Spring attachments 389 non-rigidly secure the rotatable table 393 to a turntable frame 391, allowing the chock assembly 392 to move in a plane in response to movements of the cradled tire 159 as the steering angle changes, i.e. for accommodating any changes in the steering angle, and dynamic offsets in the free-wheel hub wheel assembly position caused by an axis of steering rotation displaced from the lowest contact point of the wheel assembly 167 itself. Compression or extension of the spring attachments 389 or similar mechanism creates a steering centering force to return the rotatable table 393 back to its original position, and thereby return the wheel chocks 383 and cradled tire 159 back in line with the longitudinal axis of the vehicle 1 whenever no steering forces are applied by a driver or autonomous vehicle system. The inner CVJ 23 is attached to the wheel assembly 167 by the hub adapter 31. Otherwise, the apparatus and its function is the same as the apparatuses described above.

Figure 4A:
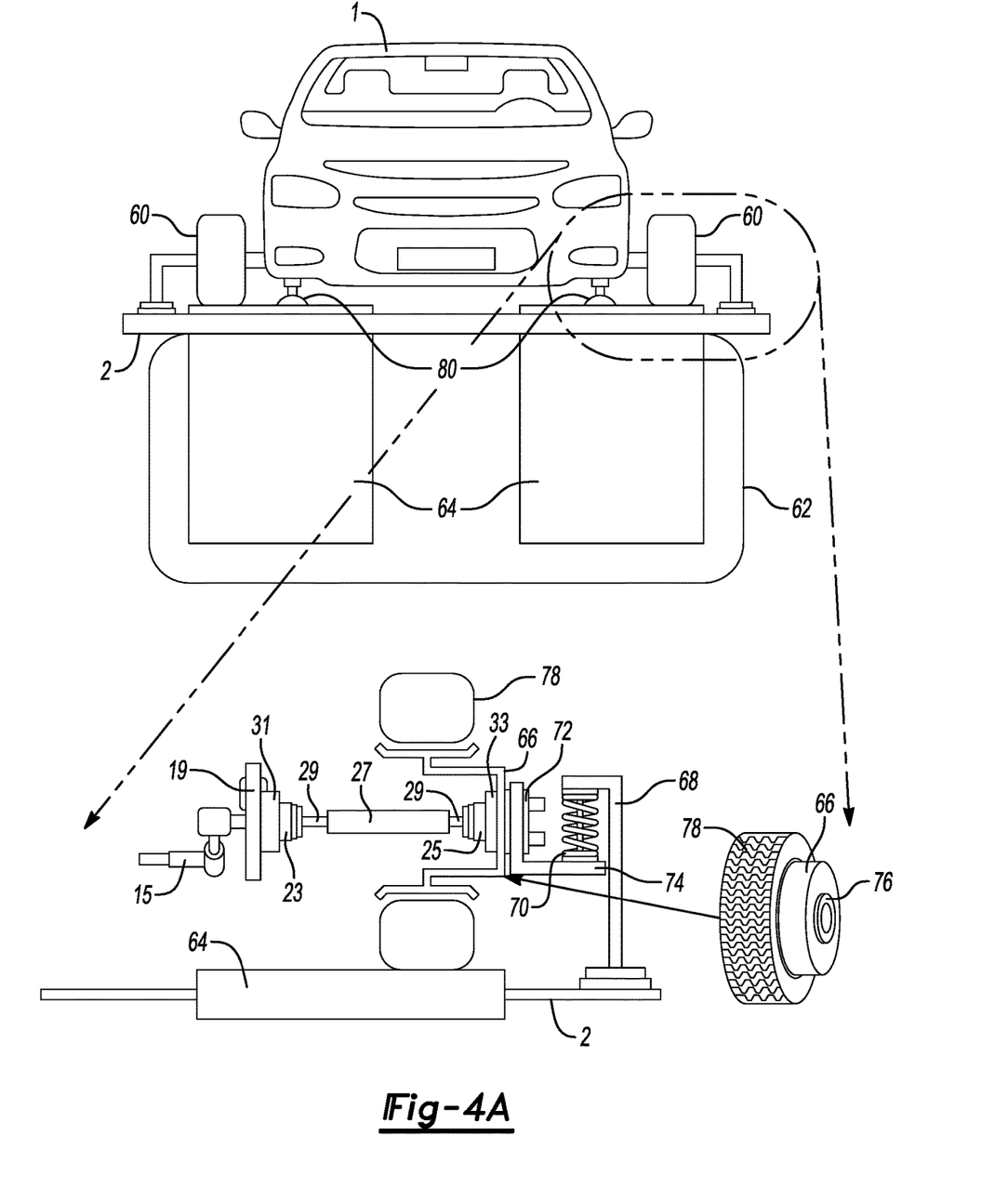
FIGS. 4A, 4B, and 4C, show, respectively, front, side, and top views of an apparatus for enabling dynamic vehicle steering in conjunction with a conventional chassis dynamometer with fixed rolls.
Figure 4B:
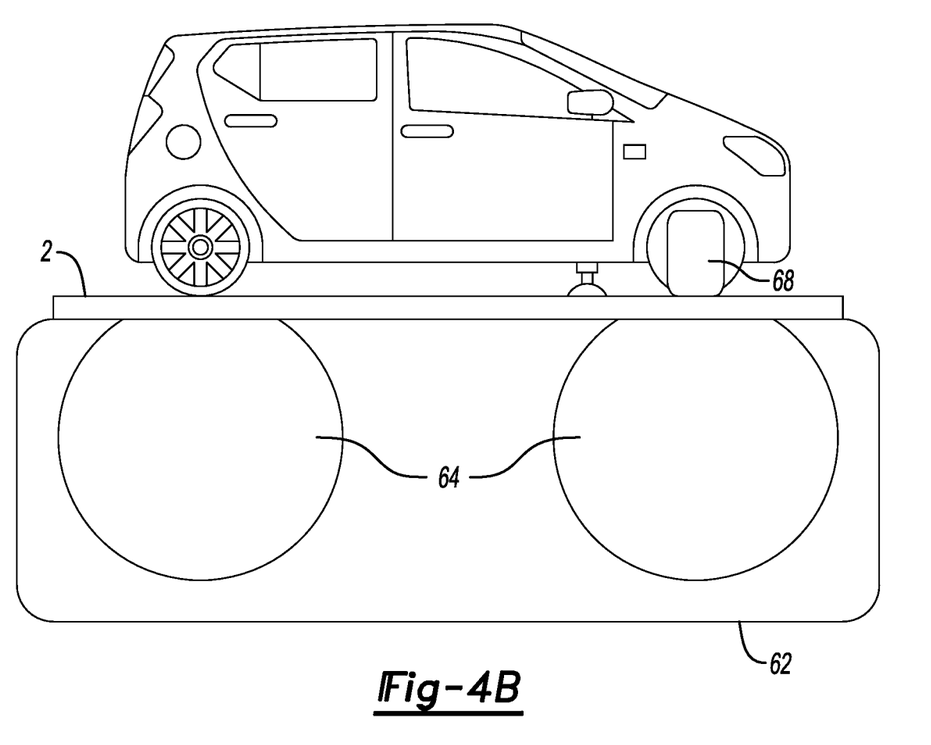
Figure 4C:
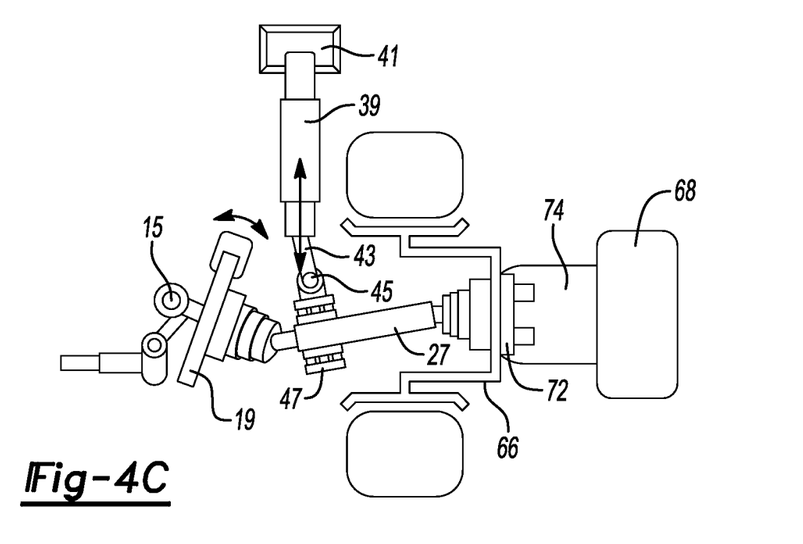

A fourth embodiment is the apparatus shown in FIGS. 4A through 4C, which is for use with a chassis roll dynamometer 62. Prior to testing a vehicle 1 in conjunction with a chassis roll dynamometer 62 that applies a load to the vehicle powertrain via the drive wheels, the vehicle 1 is placed on the chassis dynamometer 62, in the normal manner, and supported by a jacking device or a set of jacks 80, strategically placed to avoid contact with the dynamometer rolls 64. Each of the driven wheels (not shown) of the vehicle 1 is then removed. A deep well dedicated wheel 66 with mounted tire 78 is mated with a wheel mounting arm bracket 74 bearing flange 72 via the outer shaft adapter 33. The tire 78 is placed in rolling contact with the dynamometer rolls 64 and the bracket mounting arm 68 is adjusted to maintain a downward force on the deep well wheel 66 equal to the weight that is normally supported by the original vehicle wheel. The downward force is maintained by the strut 70, while the strut 70 also allows for some vertical movement between the bracket 74 and the mounting arm 68 to compensate for small changes in tire 78 diameter due to changes in tire 78 pressure and speed, as well as imperfections in the geometries of the rolls 64 and wheel 66.

The inner CVJ 23 also mates to the vehicle 1 wheel hub (not shown) located inside the brake disc 19 or brake drum, via the shaft flange adapter 31, thereby connecting the dynamometer rolls 64 to the vehicle 1 powertrain via the tire 78. By installing a deep well wheel 66 between each of the vehicle 1 driven hubs or axles and the dynamometer rolls 64 as described above, the vehicle 1 is prepared for chassis roll dynamometer testing whereby the chassis roll dynamometer 62 places a load on the vehicle powertrain through the deep well wheels. The vehicle 1 can be easily steered or self-steered without causing rotation of the tire 78 on the dynamometer rolls 64. As the vehicle hubs rotate with changes in steering angle, the rotational motion of the hubs is arrested by the geometric change and overall length change of the driveshaft assembly comprising the inner CVJ 23, outer CVJ 25, and sliding splined shafts 29, and not transmitted to the deep wheel 66 or tire 78. The top view of FIG. 4C shows the geometry of the dynamometer drive shaft 27 for steering during a right turn in which there is a rotation of the vehicle hub and mated brake disc 19 about the ball joint 15 on control arm 17 due to the action of the steering system tie rod 14. The steering angle change is not transmitted to the deep well wheel.

As described above, a vehicle traveling on a road experiences a steering centering force that causes the steering angle to return to zero when no external force is applied by the driver or by an automated steering system. Once again, to simulate this centering force during laboratory testing, an external actuator 39 is used. The actuator 39 is connected to a laboratory bed plate or floor 2 at one end by the actuator bracket 41, and a drive shaft bearing mount 47 by an actuator rod 43 and rod joint 45, at the other end as shown. The external actuator then applies a centering force to the dynamometer drive shaft 27, biasing the drive shaft 27 to remain centered, or in a straight line with respect to the inner CVJ 23 and vehicle wheel hub. The force exerted by the external actuator 39 can be constant, or can be dependent upon steering angle, depending on testing needs.

Figure 1A:
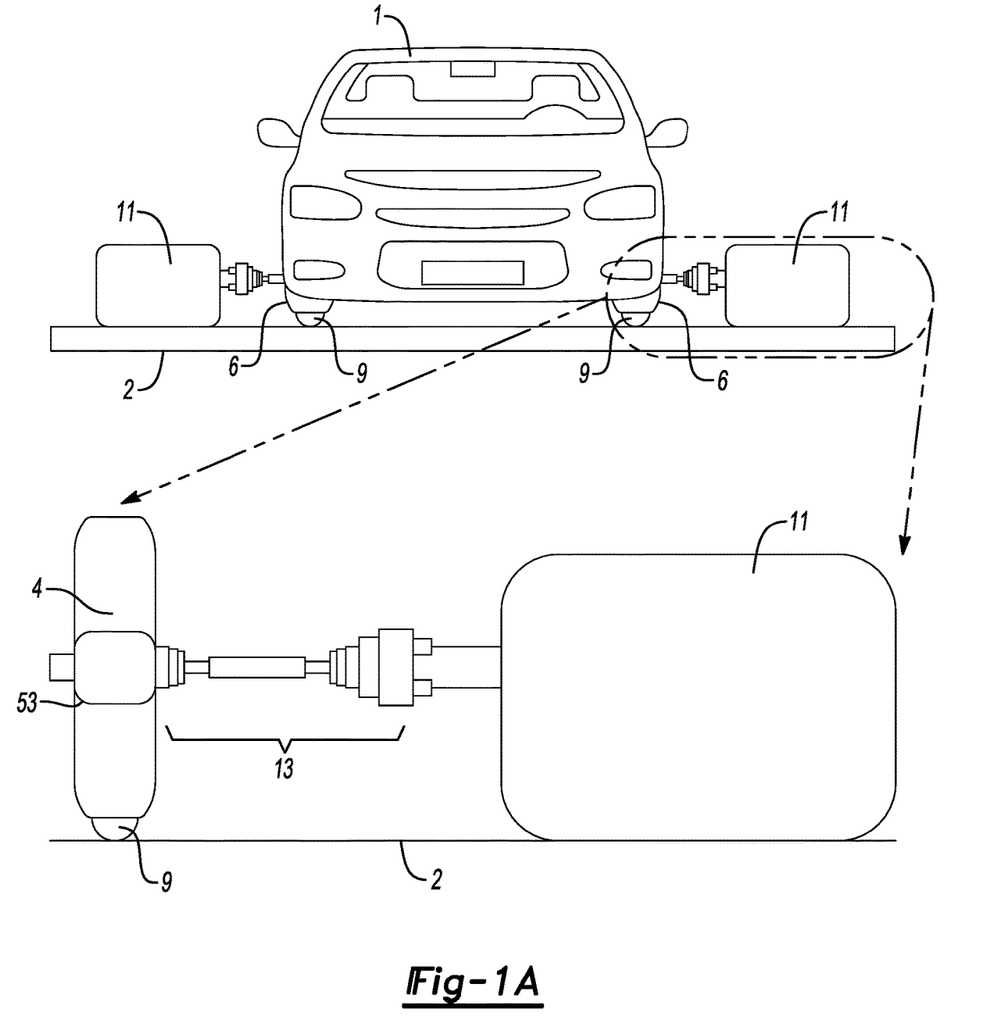
FIGS. 1A, 1B, 1C, 1D, and 1E show, respectively, front, side, bottom, top, and top views of an apparatus for enabling dynamic vehicle steering in conjunction with a conventional vehicle powertrain or axle shaft dynamometer.
Figures 1B, 1C:
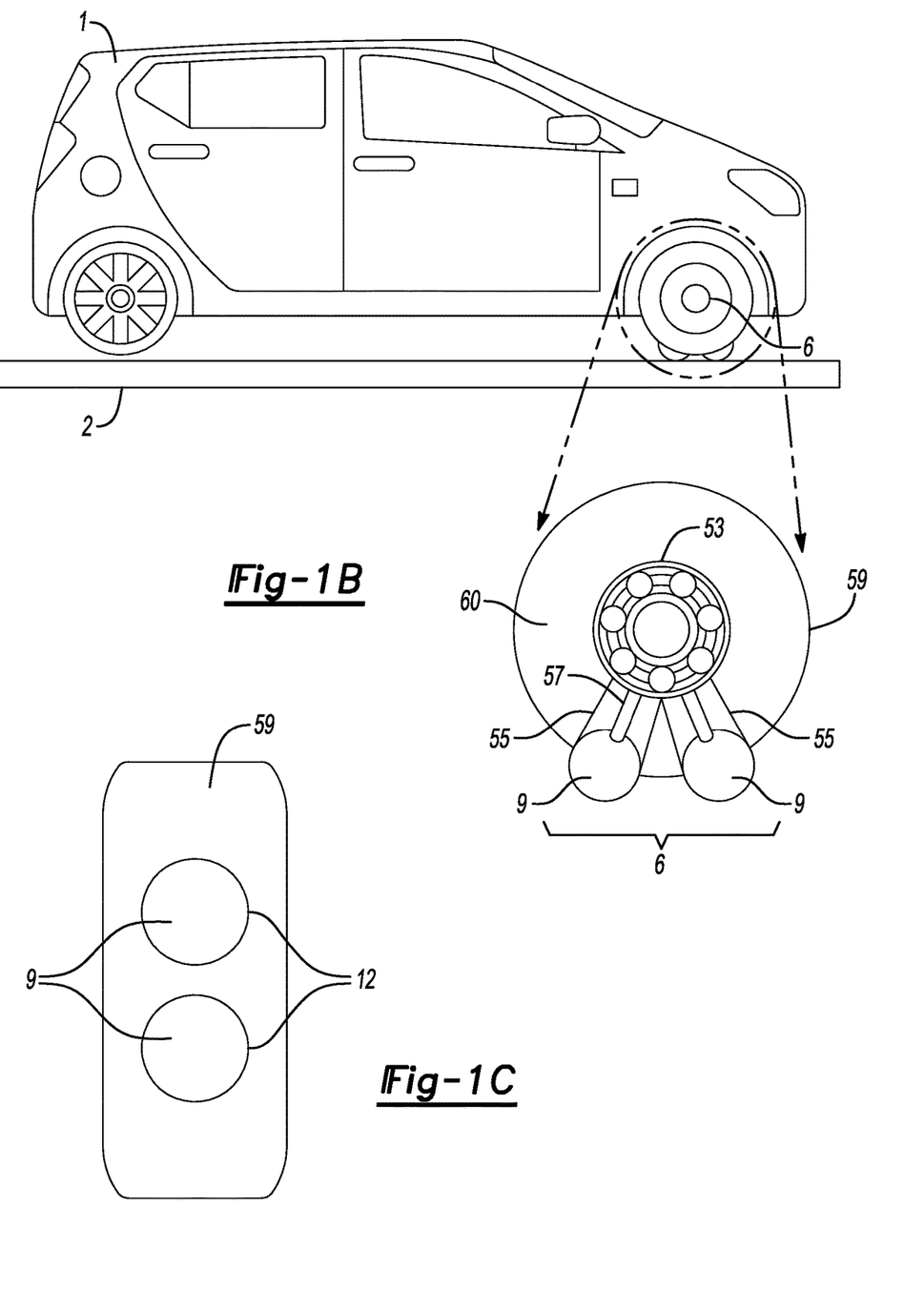
Figure 1D:
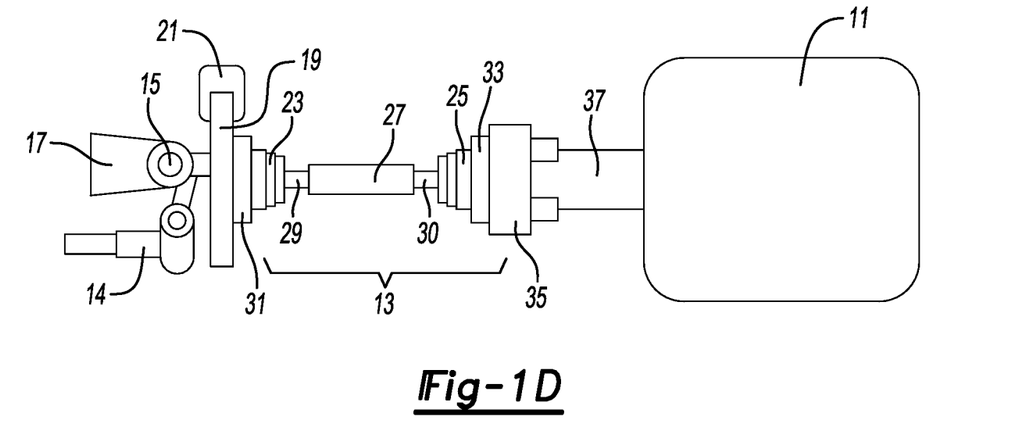
Figure 1E:
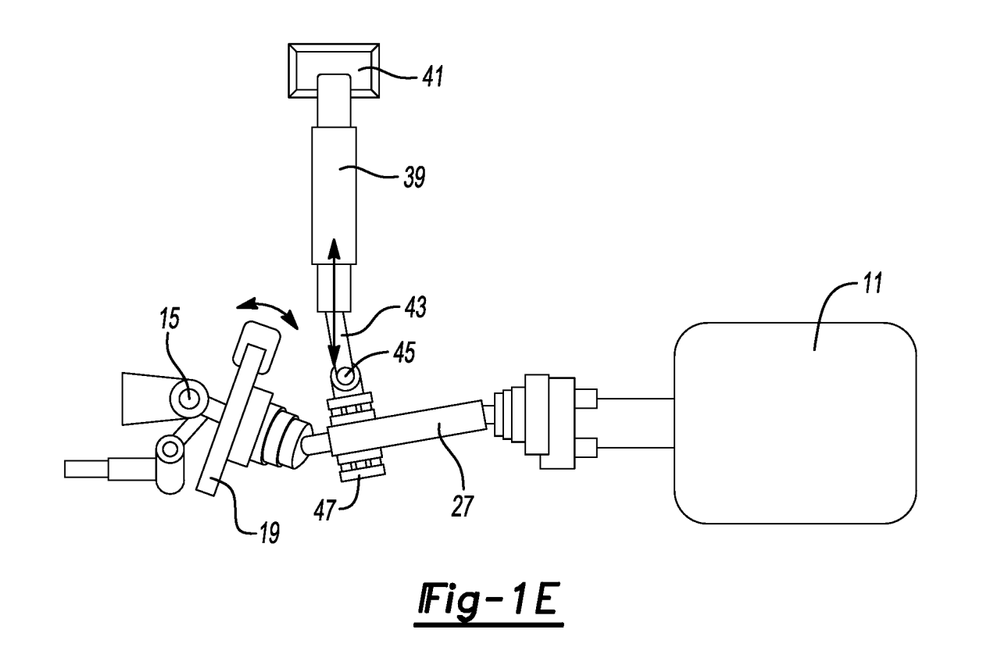
Figure 5A:
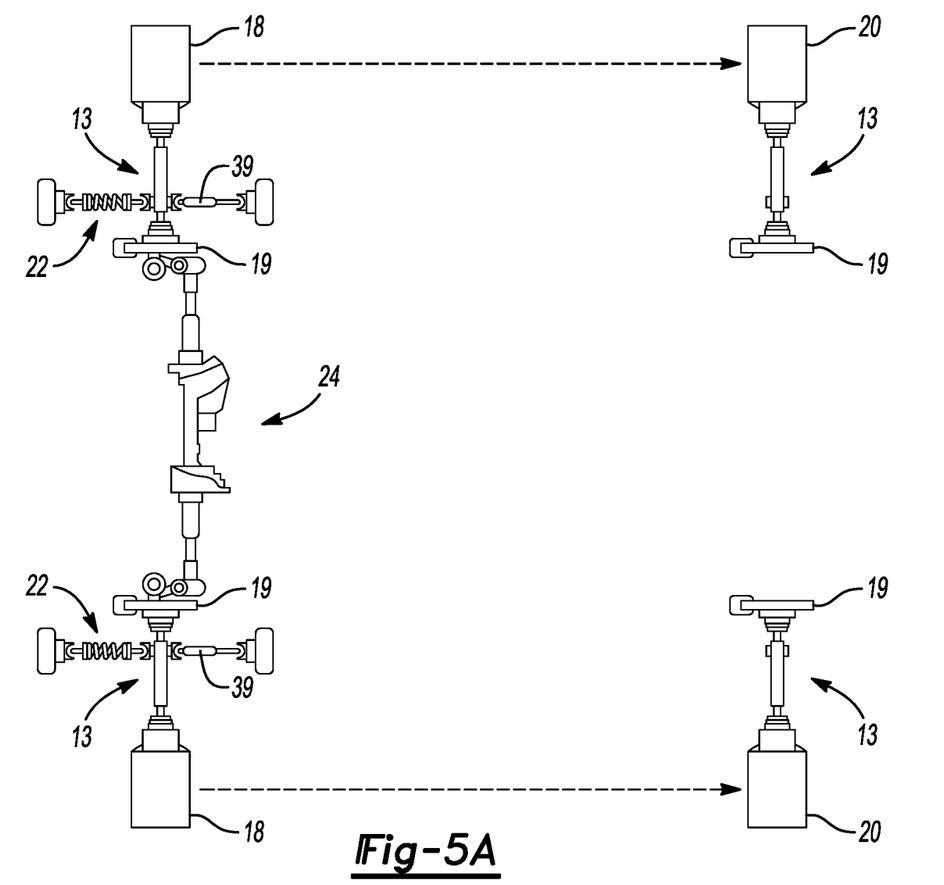
FIGS. 5A and 5B show, respectively, top and side views of an apparatus that uses an electronic link to synchronize driven and non-driven wheel hub speeds.
Figure 5B:
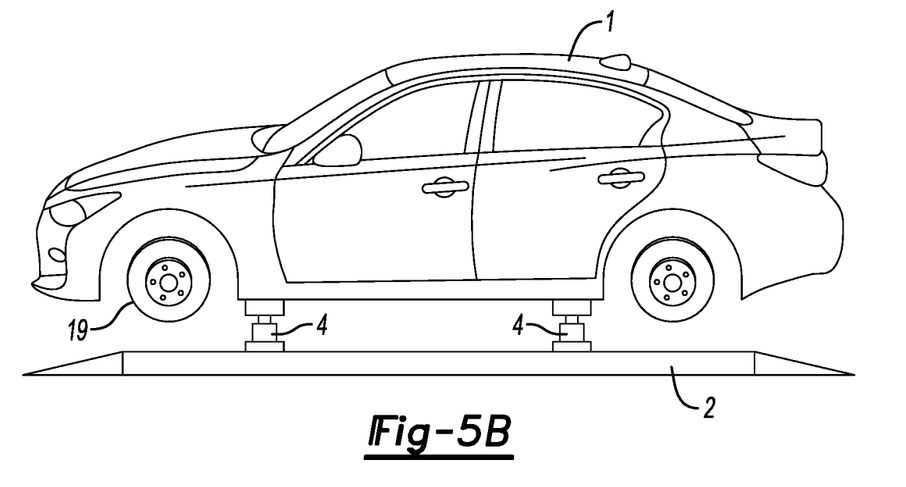

FIGS. 5A and 5B show a simplified and lower cost embodiment compared with the embodiment shown in FIG. 1A though 1E. It is for testing autonomous vehicle control systems when it is not necessary to place an external load on the vehicle's powertrain, but when it is necessary for all of the vehicle wheels to be spinning in a manner acceptable to the vehicle's control system, e.g. to avoid the detection of a malfunction by having one or more unacceptable wheel speeds.

The vehicle 1 is placed on a jack or jack stands 4 on the test cell floor 2 or bedplate to support the vehicle's weight, all of the wheels are then removed, exposing the brake disks 19 (or brake drums) fitted over each of the vehicle wheel hubs (not shown). A telescoping driveshaft 13 is mounted outboard of each wheel hub by attaching an inner hub flange adapter 31 (FIGS. 1A through 1E) to the vehicle hub, through the brake disk 19. An external actuator 39, a spring return actuator 22, or both, is attached to the drive shaft 27 (FIGS. 1A through 1E) on one end using bearing mount 47, for each telescoping driveshaft 13 mounted to a steerable wheel hub. The other end is attached to the laboratory floor 2 or test cell bed plate as described above. Non-steerable wheel hubs do not require an external actuator 39 or spring return actuator 22.

The outer end of each telescoping driveshaft 13 attached to a driven wheel hub is attached to a master motor 18 with an encoder (or just an encoder) to measure the speed of each of the driven wheels. An electronic link, e.g. a speed control signal is generated by the master motor 18 to control the speed of a corresponding slave motor 20 to synchronize the rotational speeds of the connected wheel hubs.

The outer end of each telescoping driveshaft 13 attached to a non-driven wheel hub is attached to a slave motor 20 that controls and synchronizes the speed of the corresponding non-driven wheel hub to equal the speed of its corresponding driven wheel hub. In this way, generation of vehicle fault codes due to unacceptable wheel speeds is prevented during stationary vehicle testing.

As the vehicle's autonomous control systems are being tested, including those causing dynamic changes in steering angle, the vehicle steering system 24 is free to move under control of the vehicle's autonomous control system while the rotational speeds of the driven wheel hubs are controlled by the vehicle's autonomous control system.

Figure 6:
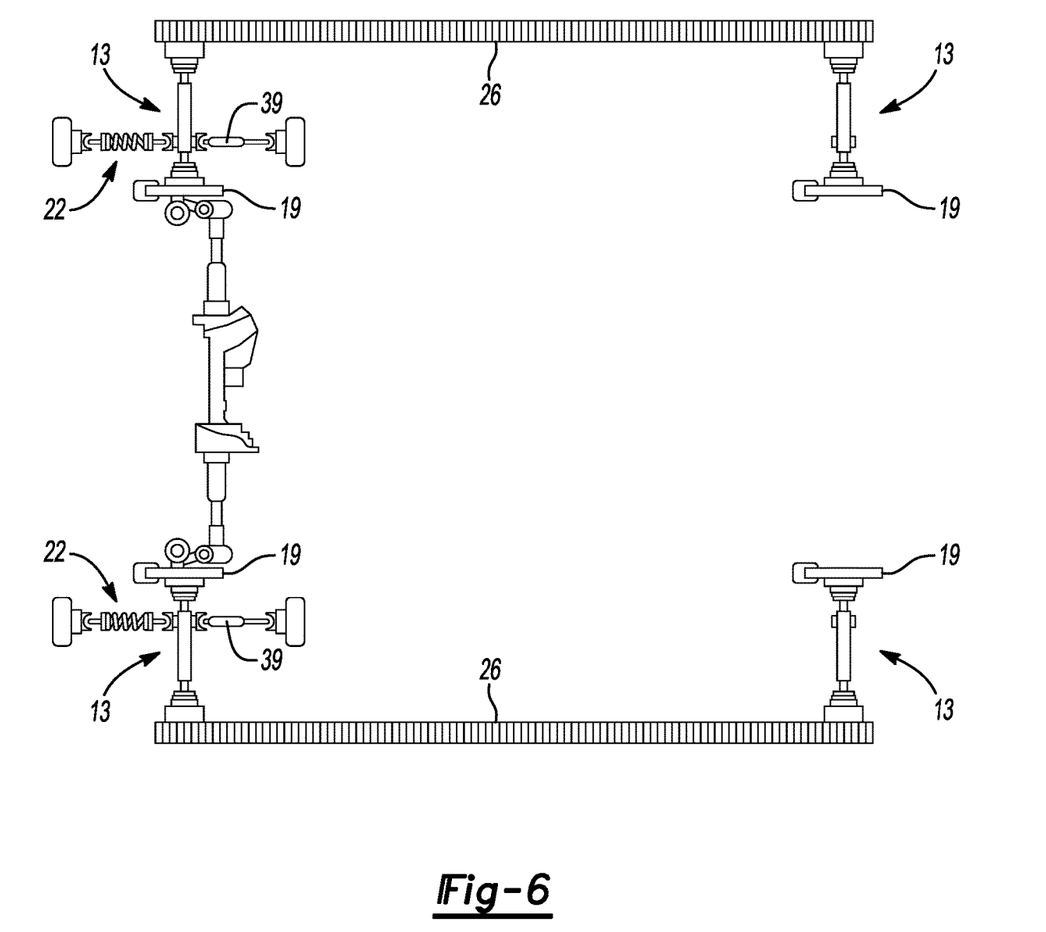
FIG. 6 shows a top view of an apparatus that uses a mechanical link to synchronize driven and non-driven wheel hub speeds.

An alternative embodiment is shown in FIG. 6. This embodiment uses a mechanical link, rather than an electronic link to synchronize the speeds of the driven and non-driven wheel hubs. For example, a belt 26 or chain connects the front and rear outer CV joint mounting flanges together on the left and right sides of the vehicle 1 as shown, rather than using master and slave motors as described in the previous embodiment.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated.

While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle test system comprising:
    an automobile wheel hub adapter configured to be attached to a wheel hub of a vehicle;
    a telescoping drive shaft, having variable angle joints on opposite ends thereof, configured to be mounted to, and out-board of, the automobile wheel hub adapter via one of the variable angle joints; and
    a turntable configured to support the wheel hub and permit the wheel hub to move responsive to changes in steering angle of the vehicle while permitting the automobile wheel hub adapter and telescoping drive shaft to rotate.

2. The vehicle test system of claim 1 including a variable length actuator attached to the telescoping drive shaft, and configured to (i) permit the telescoping drive shaft to rotate relative thereto and (ii) apply a translational force to the telescoping drive shaft to establish a predetermined angle between a longitudinal axis of the telescoping drive shaft and a central axis of at least one of the variable angle joints.

3. The vehicle test system of claim 1 including a spring attached to the telescoping drive shaft, and configured to (i) permit the telescoping drive shaft to rotate relative thereto and (ii) apply a translational force to the telescoping drive shaft to establish a predetermined angle between a longitudinal axis of the telescoping drive shaft and a central axis of at least one of the variable angle joints.

4. The vehicle test system of claim 1 further comprising a motor configured to be mounted to one of the variable angle joints and control a rotational speed of the telescoping drive shaft.

5. The vehicle test system of claim 1 further comprising a dynamometer configured to be mounted to one of the variable angle joints and control a rotational torque applied to the telescoping drive shaft.

6. The vehicle test system of claim 1, wherein the turntable includes a spring.

7. The vehicle test system of claim 1 further comprising a second automobile wheel hub adapter, a drive shaft configured to be mounted to, and out-board of, the second automobile wheel hub adapter, and a link configured to synchronize rotational speeds of the automobile wheel hub adapters.

8. The vehicle test system of claim 7, wherein the link is a belt or chain.

9. The vehicle test system of claim 7, wherein the link is an electronic link.

10. A vehicle test system comprising:
    an automobile wheel hub adapter;
    a telescoping drive shaft, having variable angle joints on opposite ends thereof, configured to be mounted to, and out-board of, the automobile wheel hub adapter via one of the variable angle joints; and
    a wheel, wherein the telescoping drive shaft is further configured to be mounted to the wheel via the other of the variable angle joints such that the telescoping drive shaft is between the automobile wheel hub adapter and wheel.

11. The vehicle test system of claim 10 further comprising a variable length actuator having a fixable end, and a movable portion including a mount configured to be attached to the telescoping drive shaft and permit the telescoping drive shaft to rotate therein, wherein the variable length actuator is configured to apply a translational force to the telescoping drive shaft to establish a predetermined angle between a longitudinal axis of the telescoping drive shaft and a central axis of at least one of the variable angle joints.

12. The vehicle test system of claim 10 further comprising a bracket arrangement configured to be mounted to ground and the wheel to support the wheel and to permit the wheel to rotate.

13. The vehicle test system of claim 12, wherein the bracket arrangement includes a strut configured to apply a variable force to the wheel directed toward the ground.

14. A vehicle test system comprising:
   an automobile wheel hub adapter configured to be attached to a wheel hub;
   a telescoping drive shaft, having variable angle joints on opposite ends thereof, configured to be mounted to, and out-board of, the automobile wheel hub adapter via one of the variable angle joints;
   a spring attached to the telescoping drive shaft, and configured to (i) permit the telescoping drive shaft to rotate relative thereto and (ii) apply a translational force to the telescoping drive shaft to establish a predetermined angle between a longitudinal axis of the telescoping drive shaft and a central axis of at least one of the variable angle joints; and
   a turntable configured to support the wheel hub and permit the automobile wheel hub adapter and telescoping drive shaft to rotate at a same speed.

15. The vehicle test system of claim 14 further comprising a motor configured to be mounted to one of the variable angle joints and control a rotational speed of the telescoping drive shaft.

16. The vehicle test system of claim 14 further comprising a dynamometer configured to be mounted to one of the variable angle joints and control a rotational torque applied to the telescoping drive shaft.

17. The vehicle test system of claim 14 further comprising a second automobile wheel hub adapter, a drive shaft configured to be mounted to, and out-board of, the second automobile wheel hub adapter, and a link configured to synchronize rotational speeds of the automobile wheel hub adapters.

18. The vehicle test system of claim 17, wherein the link is a belt or chain.

19. The vehicle test system of claim 17, wherein the link is an electronic link.

* * * * *